United States Patent [19]

Spies

[11] Patent Number: 4,996,484
[45] Date of Patent: Feb. 26, 1991

[54] METHOD AND APPARATUS FOR CANCELLING POWERLINE NOISE IN GEOPHYSICAL ELECTROMAGNETIC EXPLORATION

[75] Inventor: Brian R. Spies, McKinney, Tex.

[73] Assignee: Atlantic Richfield Company, Los Angeles, Calif.

[21] Appl. No.: 291,687

[22] Filed: Dec. 29, 1988

[51] Int. Cl.[5] .................... H01Q 23/00; G01V 3/08
[52] U.S. Cl. .................................. 324/334; 324/344; 324/345; 343/703; 343/867; 455/278; 455/298
[58] Field of Search ............... 343/720, 703, 741, 788, 343/867, 895; 324/207, 326, 337, 336, 334; 455/78, 82, 278, 283, 296, 298; 375/102, 120, 121

[56] References Cited

U.S. PATENT DOCUMENTS

| | | | |
|---|---|---|---|
| 3,731,752 | 5/1973 | Schad | 324/346 |
| 4,027,264 | 5/1977 | Gutleber | 455/206 |
| 4,247,821 | 1/1981 | Buselli | 324/336 |
| 4,314,378 | 2/1982 | Fowler et al. | 455/291 |
| 4,475,214 | 10/1984 | Gutleber | 375/102 |
| 4,542,532 | 9/1985 | McQuilkin | 455/82 |
| 4,837,514 | 6/1989 | Spies | 324/336 |
| 4,837,522 | 6/1989 | Fleury et al. | 330/149 |

OTHER PUBLICATIONS

Qian & Qian, "Automatic Power-Line Interference Canceller for Geophysical Instruments", Australian Soc. Explor. Geophys. Bull., vol. 16, Nos. 2-3, pp. 266-268, Jun.-Sep. 1985.

*Primary Examiner*—Rolf Hille
*Assistant Examiner*—Peter Toby Brown
*Attorney, Agent, or Firm*—Geoffrey A. Mantooth

[57] ABSTRACT

The present invention is used to cancel a narrow band noise of know frequency, such as 60 Hz noise generated by powerlines, in electromagnetic receiving equipment. A cancelling antenna is wrapped around the sensing antenna of the electromagnetic receiver equipment. The cancelling antenna is provided with an alternating current signal of the same frequency as the ambient powerline noise. The cancelling antenna produces an electromagnetic field that is 180 degrees out of phase and of equal amplitude to the ambient powerline noise, as measured by the sensing antenna. The alternating current is produced by a noise antenna, a phase-locked loop and an amplifier. The noise antenna receives the ambient powerline noise, the phase-locked loop locks onto and tracks the frequency of the noise, and the amplifier provides the necessary amplification.

22 Claims, 1 Drawing Sheet

METHOD AND APPARATUS FOR CANCELLING POWERLINE NOISE IN GEOPHYSICAL ELECTROMAGNETIC EXPLORATION

FIELD OF THE INVENTION

The present invention relates to methods and apparatuses for cancelling powerline noise in geophysical electromagnetic exploration systems.

BACKGROUND OF THE INVENTION

Ubiquitous 60Hz electromagnetic noise generated by powerlines is often the dominant noise source in geophysical electromagnetic exploration. Powerline noise is frequently 100 to 1000 times larger in amplitude than the geophysical signal being measured, resulting in severe reductions in the effective dynamic range of the receiving equipment. The receiving equipment may have an actual dynamic range which is sufficiently large to record the signal of interest, but the large powerline noise signals prevent the use of the most sensitive end of the dynamic range because saturation of the amplifiers will occur. Thus, the dynamic range is effectively reduced by powerline noise.

In magnetotelluric exploration systems, natural electromagnetic signals are detected, which are usually much smaller than powerline noise. Reductions in dynamic range result in an inability to detect low-amplitude portions of the natural signals.

In controlled-source electromagnetic exploration systems, powerline noise reduces the sensitivity of the measurements. Controlled-source electromagnetic exploration systems ar either time domain (transient) systems or frequency domain systems. In transient systems, where a pulse of current through a transmitter antenna induces current into the earth and the decay of the induced current is measured, reductions in the dynamic range translates to reductions in the depth of penetration of the system. This is because the depth of penetration is dependent on the length of time the induced current signal can be measured before the signal degrades into noise. By reducing the level of noise, the length of time the induced current signal is measured is increased, resulting in an increased depth of penetration. In frequency domain systems, a continuous single frequency is transmitted from an antenna to induce current into the earth. The amplitude and phase of the induced current are measured with respect to the transmitted signal. For deep penetration, low frequencies are necessary, but at low frequencies, signal strength is small. Any source of detected noise will therefore reduce the dynamic range.

Prior art electromagnetic exploration systems receive the desired signal commingled with 60Hz noise. The 60Hz noise content is reduced by subsequent processing of the received signals. The success of reducing 60Hz noise by subsequent processing is limited in its stationariness, i.e., constancy of frequency, phase, and amplitude with time. The ability to record a small signal superimposed on the noise is limited by the dynamic range of the receiving equipment, and is directly related to the signal-to-noise ratio. The smaller the signal-to-noise ratio, the less success the processing will have in extracting the noise. Therefore, what is needed is a method and an apparatus that will reduce 60Hz noise before it reaches the receiving equipment, wherein the effective dynamic range of the receiving equipment can be increased.

SUMMARY OF THE INVENTION

It is an object of the present invention to provide an apparatus and a method for increasing the effective dynamic range of electromagnetic receiving equipment.

It is a further object of the present invention to provide an apparatus and a method for reducing the noise from powerlines before the noise reaches the electromagnetic receiving equipment.

The present invention is used to cancel a narrow band noise of known frequency in electromagnetic receiving equipment having a sensing antenna. The present invention includes a cancelling antenna and alternating current means connected with the cancelling antenna. The cancelling antenna is located in close proximity to the sensing antenna. The alternating current means generates an alternating current in the cancelling antenna, with the alternating current being of the same frequency as the narrow band noise. The electromagnetic field generated by the alternating current is 180 degrees out of phase and of equal amplitude to the narrow band noise, as measured by the sensing antenna.

In geophysical electromagnetic exploration, in particular, the dominant noise source is typically 60Hz noise generated by powerlines. Powerline noise may be 100–1000 times larger than the signal of which measurement is being attempted. This results in the effective dynamic range of the receiving equipment being reduced. The present invention cancels the dominant narrow band noise source at the sensing antenna, thereby allowing an increase in the effective dynamic range of the receiving equipment.

In one aspect, the alternating current means includes a receiving antenna, a phase-locked loop, and an amplifier. The receiving antenna receives the ambient powerline noise. The phase-locked loop locks onto and tracks the frequency of the powerline noise. The amplifier amplifies the powerline noise signal so that it generates an electromagnetic field of equal amplitude to the ambient powerline noise electromagnetic field, as seen by the sensing antenna. The receiving antenna is a magnetic field sensing antenna.

DESCRIPTION OF PREFERRED EMBODIMENTS

Figure 1:
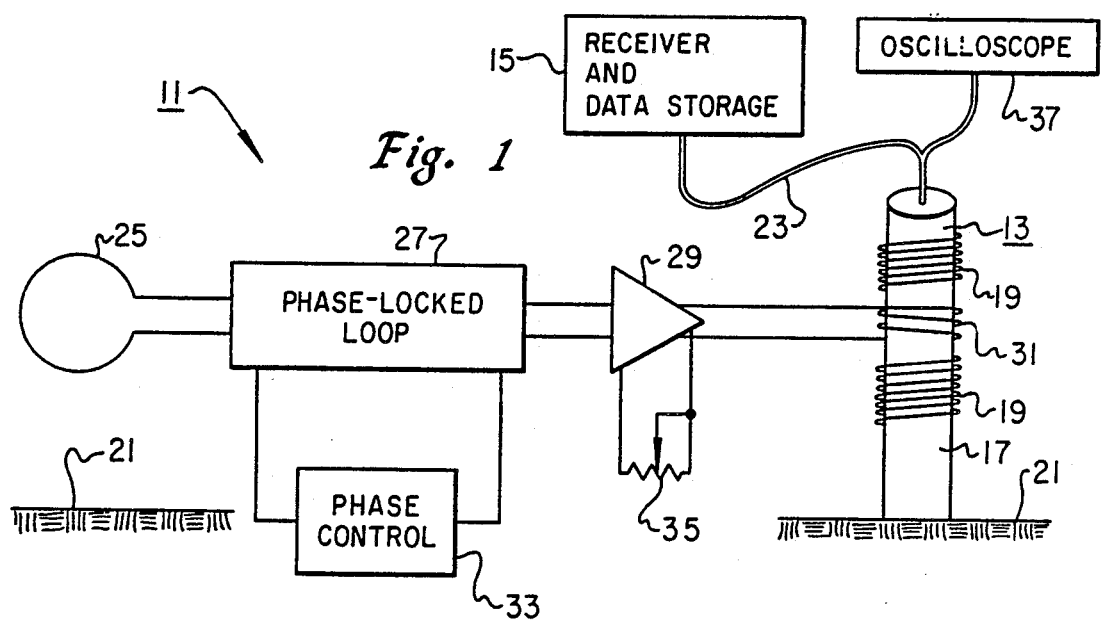
FIG. 1 is a schematic diagram of the powerline noise cancelling apparatus of the present invention, in accordance with a preferred embodiment.

The apparatus of the present invention is used to cancel noise from powerlines in electromagnetic exploration receiving equipment. In FIG. 1 there is shown a schematic diagram of the apparatus 11 of the present invention, in accordance with a preferred embodiment as used with typical electromagnetic exploration receiving equipment.

The electromagnetic exploration receiving equipment includes a sensing antenna 13 and a receiver 15. The sensing antenna 13 is a conventional current feedback magnetometer. The magnetometer 13 typically includes a tube 17 and a conductor 19 which is wound around the tube in a uniform direction. With reference to the orientation of FIG. 1, the conductor 19 is shown as being wound onto the tube counterclockwise from the lower end of the tube 17 to the upper end of the tube, when viewed from the upper end of the tube. In FIG. 1, only portions of the conductor winding are shown for clarity. The magnetometer is set vertically on the ground 21 with one end pointing up. The magnetometer 13 has output leads 23 which are connected to the receiver 15. The receiver 15 amplifies and processes the signals from the magnetometer 13 and stores them.

The electromagnetic exploration receiving equipment is used in either a natural source or a controlled source configuration. In a natural source configuration, the magnetometer receives electromagnetic signals, which originate from natural ionospheric and magnetospheric sources. In a controlled source configuration, a transmitter and a transmitting antenna (not shown) are used to generate an electromagnetic signal. The transmitted signal induces a current into the ground, the associated magnetic fields of which are detected by the magnetometer.

The apparatus 11 of the present invention includes a noise antenna 25, a phase-locked loop 27, an amplifier 29, and a cancelling antenna 31. The noise antenna 25 is a loop antenna which is connected to the input of the phase-locked loop 27. The phase-locked loop 27 is of the noninverting type and is used to lock onto the frequency of the powerline noise. The phase-locked loop 27 has a phase control 33 for allowing adjustment of the phase-locked loop to the phase of the output signal. The output of the phase-locked loop 27 is connected to the input of the amplifier 29. The amplifier 29 has a gain control 35 for allowing adjustment of the amplifier gain. The output of the amplifier 29 is connected to the cancelling antenna 31. The cancelling antenna 31 is a coil of wire wound around the magnetometer. The cancelling antenna wire is wound clockwise towards the upper end of the magnetometer tube 17 when viewed from the upper end of the tube. Thus, the cancelling antenna is wound in a direction which is opposite to the direction of the magnetometer conductor winding. The number of turns that form the cancelling antenna 31 is determined by variables such as the gain available from the amplifier 29 and the size of the cancelling antenna. The cancelling antenna 31 is configured on the magnetometer 13 so that it can produce an electromagnetic field that is of the same amplitude as the electromagnetic field of the ambient powerline noise. To increase the amplitude of the electromagnetic field from the cancelling antenna, more turns can be added to the cancelling antenna. Thus, a relatively large number of turns can be used for the cancelling antenna in order to provide higher amplitudes to compensate for a low gain amplifier or thick insulation separating the cancelling antenna and the magnetometer.

The cancelling antenna 31 need not be wound on the sensing antenna 13. The cancelling antenna can be a closed loop positioned on the ground around the sensing antenna, or a closed loop positioned to one side of the sensing antenna, or a long wire positioned to one side of the sensing antenna, as long as the cancelling antenna is configured to produce an electromagnetic field that is of the same amplitude and of opposite phase as the ambient powerline noise. The cancelling antenna 31 is placed in proximity to the sensing antenna 13. The closer the cancelling antenna is to the sensing antenna, the lower the current required in the antenna and hence the smaller the electromagnetic field that is generated into the ground by the cancelling antenna.

The operation of the apparatus 11 of the present invention will now be described. With the apparatus set up as described above, the noise antenna 25 is positioned above the ground 21 at some orientation that will minimize the pickup of either the natural electromagnetic signal (in magnetotelluric exploration) or the electromagnetic signal (in controlled-source electromagnetic or CSEM exploration). For example, in CSEM exploration using a receiving antenna located in the center of a horizontal transmitting antenna, the noise antenna 25 will be oriented so as to lie in a vertical plane.

The noise antenna 25 can be located in an area which is physically remote from the sensing antenna 13. Thus, the noise antenna can be located close to a noise source so as to maximize powerline noise pickup and minimize geophysical signal pickup. Before commencing acquisition of data from the magnetometer, the apparatus 11 of the present invention is turned on. The noise antenna 25 receives the ambient powerline noise, which is typically the dominant type of noise. The phase-locked loop 27 acts as a narrow band filter, rejecting all frequencies other than frequencies around 60Hz. The phase-locked loop passes a noise signal that is locked onto the frequency of the powerline noise. The amplifier 29 amplifies the noise signal which then goes to the cancelling antenna 31. The noise antenna 25, the phase-locked loop 27, and the amplifier 29 generate an alternating current in the cancelling antenna 31, which alternating current produces an electromagnetic field about the cancelling antenna.

The apparatus is adjusted to produce an electromagnetic field which is detected by the magnetometer 13 as being of equal amplitude and 180 degrees out of phase to the ambient powerline noise. The electromagnetic field produced by the cancelling antenna is 180 degrees out of phase with the powerline noise because the cancelling antenna is wound on the magnetometer in a direction which is opposite to the direction of the magnetometer conductor winding. The cancelling antenna 31 introduces some phase shift into the generated cancelling signal due to the capacitance and inductance inherent in the cancelling antenna. The phase control 33 and gain control 35 compensate for the electrical characteristics of the cancelling antenna by allowing the appropriate adjustments. The adjustments can be made by connecting an oscilloscope 37, or other suitable device, to the output of the magnetometer. The phase control 33 and gain control 35 are then adjusted until the powerline noise, as viewed on the oscilloscope 37, is nulled.

Once the apparatus is adjusted, data acquisition by way of the magnetometer can begin. The cancelling antenna 31 produces an electromagnetic field that is equal in amplitude and 180 degrees out of phase to the ambient powerline noise electromagnetic field, as seen by the magnetometer 13. The powerline noise is effectively cancelled out at the magnetometer. The gain of the amplifier inside of the receiver 15 can be increased, without concern of the amplifier becoming saturated by large noise signals, wherein small signals of interest can be detected. Thus, the effective dynamic range of the electromagnetic receiving equipment is increased with the apparatus and method of the present invention. With magnetotelluric and controlled-source electromagnetic exploration systems used for deep exploration, the frequencies of interest are lower than 60Hz. Thus, the cancelling antenna, when producing a field to cancel powerline noise, will not significantly affect the signals of interest. The distortion will also be small when used with higher-frequency systems because the cancellation coil 25 has been oriented in such a way to minimize the detection of the geophysical signal of interest.

During operation, the frequency of the powerline noise may shift slightly. The phase-locked loop 27 automatically tracks frequency shifts in the powerline noise so that the apparatus produces an electromagnetic field at the cancelling antenna that is of the same frequency as the ambient powerline noise. The apparatus automatically tracks amplitude of the powerline noise by virtue of the fixed gain of the amplifier 29.

Figure 2:
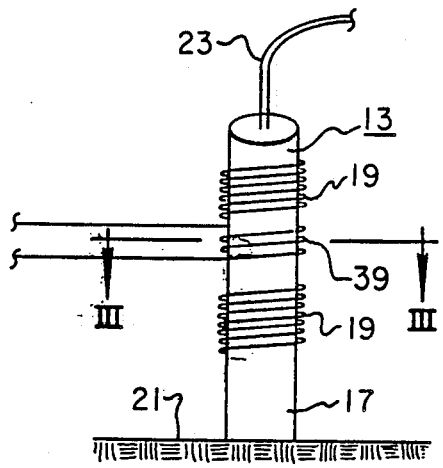
FIG. 2 is a schematic diagram of the cancelling antenna of the apparatus, in accordance with another embodiment.
Figure 3:
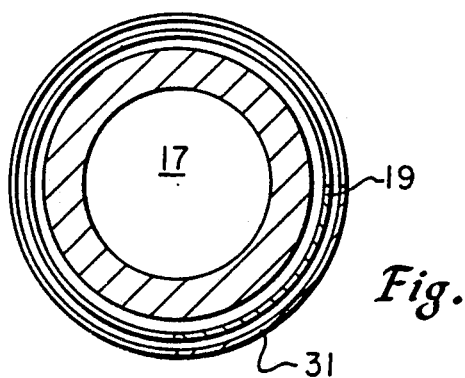
FIG. 3 is a transverse cross-sectional view showing the relationship of the cancelling antenna to the magnetometer, taken through lines III—III of FIG. 2.

In FIG. 2, there is shown the cancelling antenna 39, in accordance with another embodiment. The cancelling antenna 39 is a coil of wire wound onto the magnetometer conductor winding 19. With reference to the orientation of FIG. 2, the cancelling antenna 39 is wound counterclockwise towards the upper end of the magnetometer tube 17, when viewed from the upper end of the tube. Thus the cancelling antenna 39 is wound in the same direction as the magnetometer conductor winding 19. The cancelling antenna 39 is connected to the output of the amplifier 27 as described above with reference to FIG. 1. In this embodiment, the phase-locked loop 27 is of the inverting type, so that the electromagnetic field produced by the cancelling antenna is 180 degrees out of phase with the ambient powerline noise.

Although the apparatus of the present invention has been described for use in cancelling powerline noise, the apparatus can, in general, be used to cancel a narrow band noise of known frequency. Also, the apparatus can be used to cancel harmonic frequencies, such as 180 Hz, of powerline noise.

Although the apparatus of the present invention has been described in conjunction with a current feedback magnetometer, the apparatus of the present invention will operate to cancel powerline noise with any type of magnetometer or induction coil magnetic field sensor. Furthermore, because powerline noise is a sinusoidal signal, the type of noise antenna need not match the type of sensing antenna. For example, the noise antenna could be an induction coil sensor, which measures the derivative of the magnetic field, and the sensing antenna could be a magnetometer which measures the magnetic field. The derivative of a sinusoid is a phase-shifted sinusoid. Therefore, the phase control 33 can be used to provide the phase compensation necessitated by the unmatched noise and sensing antennas.

The foregoing disclosure and the showings made in the drawings are merely illustrative of the principles of the invention and are not to be interpreted in a limiting sense.

I claim:

1. An apparatus for cancelling a narrow band noise of known frequency in geophysical electromagnetic receiving equipment having a sensing antenna for receiving electromagnetic signals including said narrow band noise, comprising:
   (a) a cancelling antenna located in proximity to said sensing antenna such that said cancelling antenna can create an electromagnetic field that is of equal amplitude to said narrow band noise as detected by said sensing antenna;
   (b) alternating current means connected to said cancelling antenna for generating an alternating current in said cancelling antenna, said generated alternating current being of the same frequency as said narrow band noise, said generated alternating current in said cancelling antenna creating an electromagnetic field that is 180 degrees out of phase and of equal amplitude to said narrow band noise as detected by said sensing antenna.

2. The apparatus of claim 1 wherein said alternating current means comprises means for tracking the frequency of said narrow band noise, wherein said alternating current means generates alternating current that is synchronous with the frequency of said narrow band noise.

3. The apparatus of claim 1, wherein said alternating current means further comprises:
   (a) a receiving antenna which receives said ambient powerline noise;
   (b) narrow band filter means connected with said receiving antenna, said filter means for passing said ambient powerline noise and rejecting other frequencies;
   (c) an amplifier connected with said filter means so as to amplify said passed ambient powerline noise signal, said amplifier connected with said cancelling antenna so as to provide an amplified ambient powerline noise signal to said cancelling antenna, said amplifier having gain adjustment means.

4. The apparatus of claim 3 wherein said narrow band filter means comprises a phase-locked loop.

5. An apparatus for cancelling powerline noise in electromagnetic receiving equipment having a sensing antenna for receiving electromagnetic signals including ambient powerline noise, comprising:
   (a) a cancelling antenna positioned around said sensing antenna such that said cancelling antenna can create an electromagnetic field that is of equal amplitude to said ambient powerline noise as detected by said sensing antenna;
   (b) alternating current means connected to said cancelling antenna for generating an alternating current in said cancelling antenna, said generated alternating current being of the same frequency as said ambient powerline noise, said generated alternating current in said cancelling antenna creating an electromagnetic field that is 180 degrees out of phase and of equal amplitude to said ambient powerline noise as detected by said sensing antenna.

6. The apparatus of claim 5, wherein said alternating current means further comprises:
   (a) a receiving antenna which receives said ambient powerline noise;
   (b) narrow band filter means connected with said receiving antenna, said filter means for passing said ambient power line noise and rejecting other frequencies;
   (c) an amplifier connected with said filter means so as to amplify said passed ambient powerline noise signal, said amplifier connected with said cancelling antenna so as to provide an amplified ambient powerline noise signal to said cancelling antenna, said amplifier having gain adjustment means.

7. The apparatus of claim 6 wherein said narrow band filter means comprises a phase-locked loop.

8. The apparatus of claim 5 wherein:

(a) said sensing antenna comprises a magnetometer having a conductor wound in a uniform direction;
(b) said cancelling antenna is wrapped around said conductor winding of said magnetometer in a direction which is the same as the direction of the magnetometer conductor winding;
(c) said alternating current means delivers to said cancelling antenna an alternating current which is 180 degrees out of phase with said ambient powerline noise.

9. The apparatus of claim 8, wherein said alternating current means further comprises:
(a) a receiving antenna which receives said ambient powerline noise;
(b) narrow band filter means connected with said receiving antenna, said filter means for passing said ambient power line noise and rejecting other frequencies;
(c) an amplifier connected with said filter means so as to amplify said passed ambient powerline noise signal, said amplifier connected with said cancelling antenna so as to provide an amplified ambient powerline noise signal to said cancelling antenna, said amplifier having gain adjustment means.

10. The apparatus of claim 9 wherein said narrow band filter means comprises a phase-locked loop.

11. The apparatus of claim 5 wherein:
(a) said sensing antenna comprises a magnetometer having a conductor wound in a uniform direction;
(b) said cancelling antenna is wrapped around said conductor winding of said magnetometer in a direction which is opposite to the direction of the magnetometer conductor winding;
(c) said alternating current means delivers to said cancelling antenna an alternating current which is in phase with said ambient powerline noise.

12. The apparatus of claim 11, wherein said alternating current means further comprises:
(a) a receiving antenna which receives said ambient powerline noise;
(b) narrow band filter means connected with said receiving antenna, said filter means for passing said ambient power line noise and rejecting other frequencies;
(c) an amplifier connected with said filter means so as to amplify said passed ambient powerline noise signal, said amplifier connected with said cancelling antenna so as to provide an amplified ambient powerline noise signal to said cancelling antenna, said amplifier having gain adjustment means.

13. The apparatus of claim 12 wherein said narrow band filter means comprises a phase-locked loop.

14. The apparatus of claim 5 wherein said cancelling antenna is wound around said sensing antenna.

15. A method for cancelling powerline noise in electromagnetic exploration equipment having a sensing antenna for receiving electromagnetic signals including ambient powerline noise, comprising the steps of:
(a) placing a cancelling antenna around said sensing antenna, said cancelling antenna being placed relative to said sensing antenna such that when said cancelling antenna is energized with an alternating current of the same frequency as said ambient powerline noise, an electromagnetic field that is of equal amplitude to said ambient powerline noise as detected by said sensing antenna can be produced;
(b) driving said cancelling antenna with an alternating current of the same frequency as said ambient powerline noise so as to generate an electromagnetic field that is 180 degrees out of phase and of equal amplitude to said ambient powerline noise as detected by said sensing antenna.

16. The method of claim 15 wherein said sensing antenna comprises a magnetometer having a conductor winding wound in a uniform direction, further comprising the steps of:
(a) placing said cancelling antenna around said sensing antenna so that said cancelling antenna is wound in the same direction as the direction of the magnetometer conductor winding;
(b) driving said cancelling antenna with an alternating current which is 180 degrees out of phase with said ambient powerline noise.

17. The method of claim 15 wherein said sensing antenna comprises a magnetometer having a conductor winding wound in a uniform direction, further comprising the steps of:
(a) placing said cancelling antenna around said sensing antenna so that said cancelling antenna is wound in the opposite direction to the direction of the magnetometer conductor winding;
(b) driving said cancelling antenna with an alternating current which is in phase with said ambient powerline noise.

18. A method for cancelling powerline noise in electromagnetic exploration equipment having a sensing antenna for receiving electromagnetic signals including ambient powerline noise, comprising the steps of:
(a) placing a cancelling antenna in proximity to said sensing antenna, said cancelling antenna being placed relative to said sensing antenna such that when said cancelling antenna is energized with an alternating current of the same frequency as said ambient powerline noise, an electromagnetic field that is 180 degrees out of phase and of equal amplitude to said ambient powerline noise as detected by said sensing antenna is produced;
(b) driving said cancelling antenna with an alternating current of the same frequency as said ambient powerline noise so as to generate an electromagnetic field that is 180 degrees out of phase and of equal amplitude to said ambient powerline noise as detected by said sensing antenna.

19. An apparatus for cancelling powerline noise in electromagnetic receiving equipment having a sensing antenna for receiving electromagnetic signals including ambient powerline noise, comprising:
(a) a cancelling antenna located on and around said sensing antenna;
(b) alternating current means connected to said cancelling antenna for generating an alternating current in said cancelling antenna, said generated alternating current being of the same frequency as said ambient powerline noise, said generated alternating current in said cancelling antenna creating an electromagnetic field that is 180 degrees out of phase and of equal amplitude to said ambient powerline noise as detected by said sensing antenna.

20. The apparatus of claim 19, wherein said alternating current means further comprises:
(a) a receiving antenna which receives said ambient powerline noise;
(b) narrow band filter means connected with said receiving antenna, said filter means for passing said ambient powerline noise and rejecting other frequencies;

(c) an amplifier connected with said filter means so as to amplify said passed ambient powerline noise signal, said amplifier connected with said cancelling antenna so as to provide an amplified ambient powerline noise signal to said cancelling antenna, said amplifier having gain adjustment means.

21. The apparatus of claim 20, wherein said narrow band filter means comprises a phase-locked loop.

22. A method for cancelling ambient powerline noise in electromagnetic exploration equipment having a sensing antenna for receiving electromagnetic signals, comprising the steps of:

(a) providing said sensing antenna with a cancelling antenna, said cancelling antenna being located on and around said sensing antenna;

(b) driving said cancelling antenna with an alternating current of the same frequency as said ambient powerline noise so as to generate an electromagnetic field that is 180 degrees out of phase and of equal amplitude to said ambient powerline noise as detected by said sensing antenna.

* * * * *